US011183732B2

(12) United States Patent
Torok et al.

(10) Patent No.: US 11,183,732 B2
(45) Date of Patent: Nov. 23, 2021

(54) NON-SEALED APPARATUS FOR BATTERIES WITH A CONTAINMENT STRUCTURE FOR GASSES

(71) Applicant: International Business Machines Corporation, Armonk, NY (US)

(72) Inventors: John Torok, Poughkeepsie, NY (US); Noah Singer, White Plains, NY (US); John S. Werner, Fishkill, NY (US); Budy Notohardjono, Poughkeepsie, NY (US); Arkadiy O. Tsfasman, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

(21) Appl. No.: 16/199,420

(22) Filed: Nov. 26, 2018

(65) Prior Publication Data

US 2020/0168870 A1 May 28, 2020

(51) Int. Cl.
*H01M 50/30* (2021.01)
*H01M 10/0525* (2010.01)
(Continued)

(52) U.S. Cl.
CPC ....... *H01M 50/30* (2021.01); *H01M 10/0525* (2013.01); *H01M 10/4235* (2013.01); *H01M 10/613* (2015.04); *H01M 50/24* (2021.01)

(58) Field of Classification Search
CPC ........ H01M 2/12; H01M 2/1094; H01M 2/34; H01M 2/127; H01M 2/1016;
(Continued)

(56) References Cited

U.S. PATENT DOCUMENTS 5,916,704 A 6/1999 Lewin
8,956,746 B2 2/2015 Cook
(Continued)

FOREIGN PATENT DOCUMENTS

CN 107621413 A 1/2018
KR 20180088467 A 8/2018
WO 2010120263 A1 10/2010

OTHER PUBLICATIONS

Arora, et al., "Review of mechanical design and strategic placement technique of a robust battery pack for electric vehicles," Renewable and Sustainable Energy Reviews, vol. 60, (2016); pp. 1319-1331.

*Primary Examiner* — Milton I Cano
*Assistant Examiner* — Suphia Quraishi
(74) *Attorney, Agent, or Firm* — Cantor Colburn LLP; Teddi Maranzano

(57) ABSTRACT

A non-sealed apparatus for batteries with a containment structure for gasses that includes a battery enclosure with an upper portion and a lower portion. The apparatus further includes a plurality of batteries disposed in a lower portion of the battery enclosure. The apparatus has at least one battery containment structure disposed in an upper portion of the battery enclosure, which is configured to move downward thereby sealing the plurality of batteries upon a condition. Further, a transfer channel assembly is provided within the battery enclosure and configured to transfer and/or contain gases emitted by the plurality of batteries upon the condition. The apparatus also has at least one fan configured to circulate the air in and out of the battery enclosure through the first perforated opening and the second perforated opening.

8 Claims, 5 Drawing Sheets

(51) Int. Cl.
*H01M 10/42* (2006.01)
*H01M 10/613* (2014.01)
*H01M 50/24* (2021.01)

(58) Field of Classification Search
CPC .... H01M 2/0434; H01M 2/0443; H01M 2/14; H01M 2/321; H01M 10/4235; H01M 10/0525; H01M 10/613; H01M 10/52; H01M 10/60; H01M 10/48; H01M 10/486; H01M 10/0434; H01M 10/42; H01M 10/4207; H01M 10/61; H01M 10/615; H01M 10/62; H01M 10/63; H01M 10/44; H01M 10/443; H01M 2010/4271; H01M 2010/4278; H01M 2200/00; H01M 10/483; H01M 10/441; Y02E 60/10
USPC .......................................................... 429/210
See application file for complete search history.

(56) References Cited

U.S. PATENT DOCUMENTS

| | | |
|---|---|---|
| 9,689,624 B2 | 6/2017 | Timmons et al. |
| 2010/0136393 A1 | 6/2010 | Takezawa et al. |
| 2014/0127537 A1 | 5/2014 | Pflueger et al. |
| 2015/0221914 A1* | 8/2015 | Page ................... H01M 2/1016 429/82 |
| 2016/0359154 A1 | 12/2016 | Harris et al. |
| 2017/0047564 A1 | 2/2017 | Bianchi et al. |
| 2018/0088467 A1 | 3/2018 | Baselmans et al. |
| 2018/0205054 A1* | 7/2018 | Kobayashi .............. H01M 2/12 |
| 2018/0241105 A1* | 8/2018 | Bieber .............. H01M 10/6563 |

\* cited by examiner

NON-SEALED APPARATUS FOR BATTERIES WITH A CONTAINMENT STRUCTURE FOR GASSES

BACKGROUND

The present invention generally relates to battery enclosures. More specifically, the present invention relates to a non-sealed apparatus for batteries with a containment structure for gasses, for example, lithium-ion batteries.

Lithium-ion batteries have the potential to experience an internal short due to, for example, a latent manufacturing defect, which can lead to a process of thermal runaway. Thermal runaway occurs when the batteries release heat abnormally due to a defect, short-circuit or uneven electricity in the charging/discharging process. During a thermal runaway event, the batteries' temperature can increase significantly thereby causing the flammable electrolyte contained within the batteries to ignite or possibly explode when the electrolyte is exposed to oxygen in the atmosphere. Further, during thermal runaway and/or if the pressure within the batteries exceeds the design threshold, an internal battery safety feature allows the batteries to "vent" by releasing gas into the atmosphere.

There is therefore a need to reduce the risks associated with thermal runaway, and more specifically there is a need to isolate and capture harmful gasses released from the batteries associated with a thermal runaway event.

SUMMARY

In one aspect, the present invention provides a non-sealed apparatus for batteries with a containment structure for gasses that includes a battery enclosure with an upper portion and a lower portion. The battery enclosure has a first perforated opening and a second perforated opening. The apparatus further includes a plurality of batteries disposed in the lower portion of the battery enclosure. In addition, the apparatus has at least one battery containment structure disposed in the upper portion of the battery enclosure, which is configured to move downward thereby sealing the plurality of batteries upon a condition. A transfer channel assembly is provided within the battery enclosure and configured to transfer and/or contain gases emitted by the plurality of batteries upon the condition. The apparatus also has at least one fan configured to circulate the air in and out of the battery enclosure through the first perforated opening and the second perforated opening.

In one aspect, the present invention provides a method for gas containment in a non-sealed apparatus for batteries. The method includes connecting the non-sealed apparatus for batteries with a system. The non-sealed apparatus for batteries includes a battery enclosure with an upper portion and a lower portion. The battery enclosure has a first perforated opening and a second perforated opening. The apparatus also contains a plurality of batteries disposed in the lower portion of the battery enclosure. At least one battery containment structure disposed in the upper portion of the battery enclosure is also provided. The apparatus includes a transfer channel assembly disposed within the battery enclosure and at least one fan configured to circulate the air in and out of the battery enclosure through the first perforated opening and the second perforated opening. The method further includes monitoring each battery of the plurality of batteries for a condition. Once the condition occurs, the method provides for moving downward the at least one battery containment structure thereby sealing the plurality of batteries. The method further includes containing or transferring out gases emitted by the plurality of batteries via the transfer channel assembly. Lastly, the method includes disconnecting the non-sealed apparatus for batteries from the system.

BRIEF DESCRIPTION OF THE DRAWINGS

In order for the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, aspects of the invention will be described and explained with additional specificity and detail through the use of the accompanying drawings.

DETAILED DESCRIPTION

Figure 1:
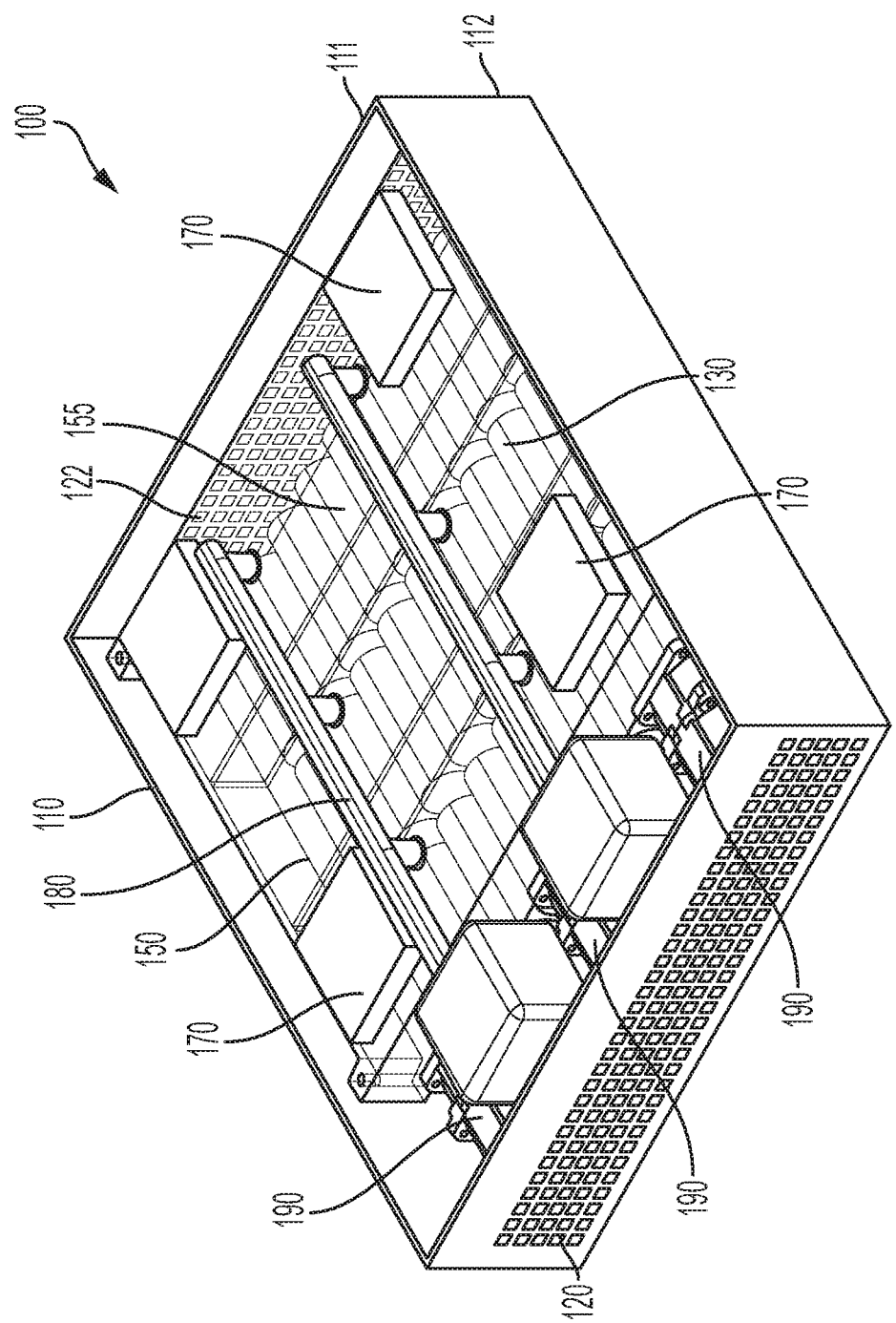
FIG. 1 depicts a non-sealed apparatus for batteries with a containment structure for gasses according to embodiments of the invention.

Reference to "a specific embodiment" or a similar expression in the specification means that specific features, structures, or characteristics described in the specific embodiments are included in at least one specific embodiment of the present invention. Hence, the wording "in a specific embodiment" or a similar expression in this specification does not necessarily refer to the same specific embodiment.

Hereinafter, various embodiments of the present invention will be described in more detail with reference to the accompanying drawings. Nevertheless, it should be understood that the present invention could be modified by those skilled in the art in accordance with the following description to achieve the excellent results of the present invention. Therefore, the following description shall be considered as a pervasive and explanatory description related to the present invention for those skilled in the art, not intended to limit the claims of the present invention.

Reference to "an embodiment," "a certain embodiment" or a similar expression in the specification means that related features, structures, or characteristics described in the embodiment are included in at least one embodiment of the present invention. Hence, the wording "in an embodiment," "in a certain embodiment" or a similar expression in this specification does not necessarily refer to the same specific embodiment.

A non-sealed apparatus for batteries with a containment structure for gasses, for example, lithium-ion batteries, is provided. Generally, a lithium-ion battery includes an anode, a cathode, and an electrolyte disposed between the anode and the cathode. Lithium-ion batteries are produced in a number of variations. For example, the most popular lithium-ion batteries, which have the highest energy density, use a cobalt or nickel-cobalt oxide anode. However, these batteries are prone to experiencing a process of thermal runaway. The batteries have the disadvantage of having the ability to create their own internal supply of oxygen when overheated. Oxygen is liberated from the oxide material of the anode at elevated temperatures, which can occur due to a variety of causes or conditions, such as an internal short circuit, overcharging, or other causes. The liberated oxygen combined with the flammable electrolyte can ignite or explode when the mixture is exposed to the atmosphere.

More specifically, the thermal runaway diffusion occurs when one of the batteries in a battery module releases heat abnormally due to short-circuit or uneven electricity (e.g., low volume or high internal resistance) in the charging/discharging process. Once the battery exceeds a threshold temperature for the thermal runaway reaction (about 150° C.), the material in the battery gradually goes through a thermal decomposition exothermic reaction. The thermal decomposition exothermic reaction is a self-heating auto-catalytic reaction, where the temperature of the battery is increased rapidly. When thermal runaway occurs, the temperature of the battery can exceed 500° C. and the self-heating temperature increase is more than 20° C. per minute. Therefore, after exceeding the threshold thermal runaway temperature, the battery increases its temperature rapidly so as to result in thermal runaway. The thermal energy released from the thermal runaway of this battery can heat up the neighboring batteries causing thermal runaway to cascade throughout an entire module.

During a thermal runaway, an internal battery safety features allow the release of toxic gas (a byproduct of the reactions described above) into the atmosphere. Such gases can be harmful to the atmosphere, equipment, product, and personnel. The non-sealed apparatus for batteries with a containment structure for gasses according to embodiments of the invention is provided to reduce the risks associated with thermal runaway, and more specifically to isolate and capture harmful gasses released from the batteries in the atmosphere due to thermal runaway.

Figure 3A:
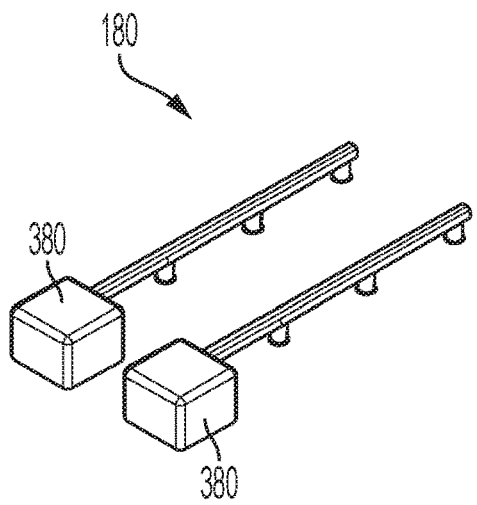
FIGS. 3A-3E depict components of the apparatus according to embodiments of the invention.
Figure 3B:
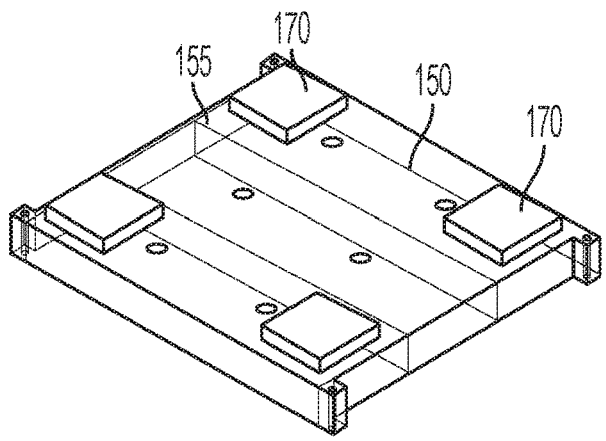
Figure 3C:
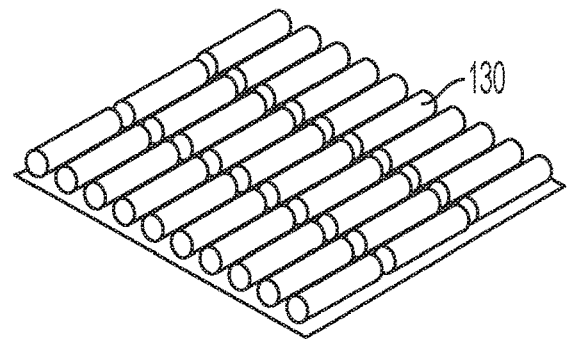
Figure 3D:
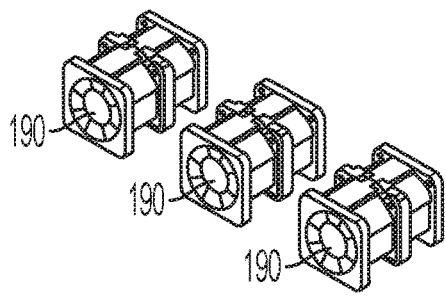
Figure 3E:
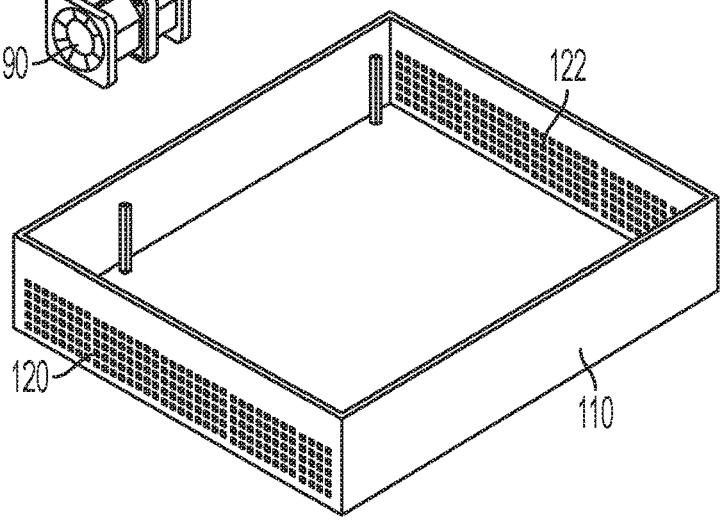

FIG. 1 illustrates a non-sealed apparatus 100 for batteries 130 having a battery enclosure 110 (shown individually in FIG. 3E) with an upper portion 111 and a lower portion 112. The apparatus 100 includes a plurality of batteries 130 (shown individually in FIG. 3C) disposed in the lower portion 111 of the battery enclosure 110. In embodiments of the invention, the batteries 130 are lithium-ion batteries, however, the invention described herein can be applied to any battery technology, such as lithium-ion, nickel-hydrogen, nickel-cadmium, fuel cells, or any other battery, voltage storage, and current storage device. The power from the batteries 130 can be transferred through connectors or wired directly out of the apparatus 100. The apparatus 100 can be connected to other equipment within a device, for example, a server. The apparatus 100 can be also, or alternatively, connected to outside equipment or a device.

According to embodiments of the invention, each of the batteries 130 can include a temperature and/or voltage monitoring device, such as a processor and/or sensor that can oversee the state of each individual battery. It is understood that other monitoring means of a temperature and/or voltage can be used according to embodiments of the invention.

In embodiments of the invention, the battery enclosure 110 includes a first perforated opening 120 and a second perforated opening 122. As shown in FIG. 1, the first perforated opening 120 is located in the front of the apparatus 100, and the second perforated opening 122 is in the rear of the apparatus 100. It is understood that the apparatus 100 can have an additional opening, or alternatively, include the battery enclosure 110 that is fully perforated. Further, the apparatus 100 can have at least one fan 190 (shown individually in FIG. 3D). In embodiments of the invention, the apparatus 100 includes a plurality of fans 190 positioned in proximity to the first perforated opening 120 within the battery enclosure 110. The fans 190 are configured to pull the air through the first perforated opening 120, to circulate the air across the batteries 130 thereby cooling the batteries 130, and to push the air out of the apparatus 100 through the second perforated opening 122.

As further shown in FIG. 1, the apparatus 100 includes a battery containment structure 150 (also shown individually in FIG. 3B) operably disposed in the upper portion 111 of the battery enclosure 110. The battery containment structure 150 can include activators 170. The containment structure 150 can also include separators 155 for each of the batteries 130 or a group of the batteries 130 thereby isolating the batteries 130 individually, within a row of the batteries 130 or within a column of the batteries 130. The separators 155 prevent a cascading effect during a thermal runaway event to the neighboring batteries 130 or the row or the column of the batteries 130.

Figure 5:
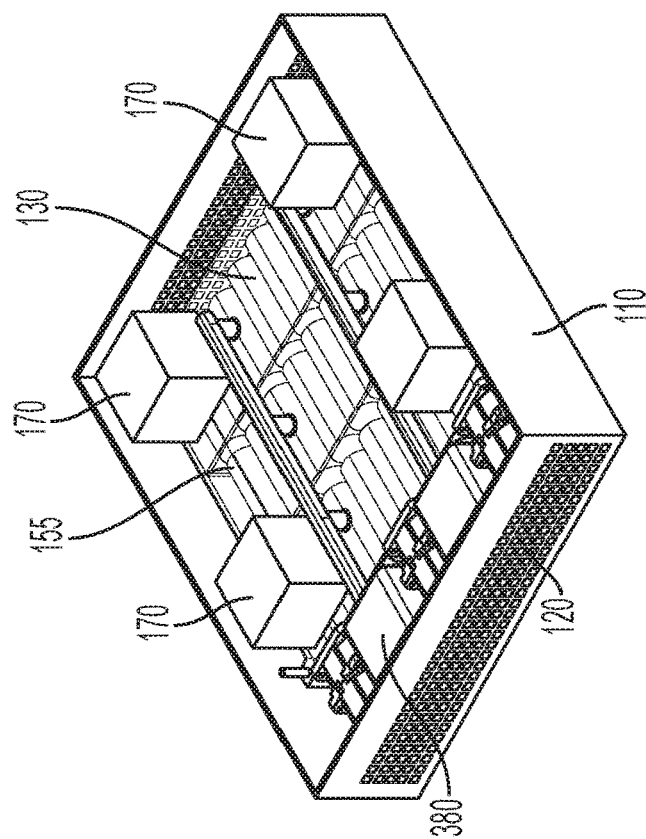
FIG. 5 depicts the battery containment structure during a failure condition of the apparatus according to embodiments of the invention.
Figure 4:
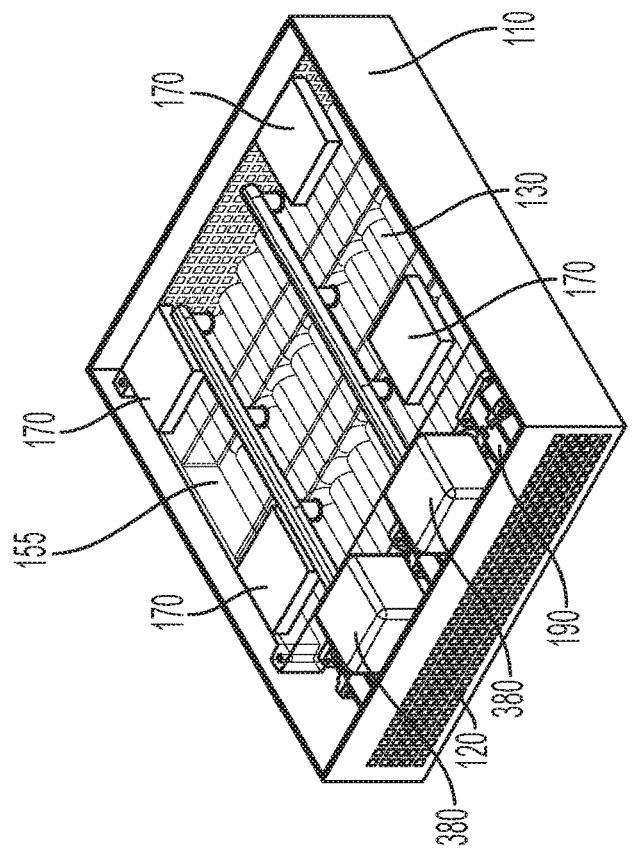
FIG. 4 depicts a battery containment structure during a normal operational condition of the apparatus according to embodiments of the invention.

FIGS. 4 and 5 show the apparatus 100 during normal and activated operational conditions, respectively. More specifically, FIG. 4 illustrates the battery containment structure 150 during the normal operational condition of the apparatus 100 according to embodiments of the invention. As further illustrated in FIG. 5, when a failure of one or more of the batteries 130 is detected, the activators 170 become engaged to move the battery containment structure 150 downward thereby covering and sealing all the batteries 130 to contain the thermal runaway event. The sealing of the failing batteries 130 can be carried out by providing a conventional seal structure in the lower portion 112. For example, a seal structure can be adopted in which a sealing surface of the battery containment structure 150 is sealed by the application of a pressing force from the activators 170 in a direction perpendicular to the bottom surface of the apparatus 100 on a gasket inserted in a groove formed in a flange facing the sealing surface of the battery containment structure 150. In embodiments of the invention, the battery containment structure 150 can be provided with a material (e.g., intumescent material) to absorb and neutralize the harmful gasses emitted by the failing batteries 130. The type of the material would depend on the type of the batteries 130 used in the apparatus 100.

The activators 170 can be any mechanism capable of applying a downward force on the battery containment structure 150. In embodiments of the invention, the activators 170 can be made of a memory shape alloy that can change to an expanded position upon application of a current, thereby creating a downward force on the battery containment structure 150. According to embodiments of the invention, nitinol shape-memory alloy can be used, which can apply approximately 9677 pounds of force per $in^2$.

Alternatively, the activators 170 can be made of an intumescent material with heating pads (not shown) arranged on top of the activators 170, such that the heating pads can be activated to expand the intumescent made activators 170, thereby creating a downward force on the battery containment structure 150. The intumescent materials are capable of supplying approximately 1935 pounds of force per $in^2$. The intumescent materials can include intercalated graphite as the active ingredient, mono-ammonium phosphates or sodium silicate and the combination of the foregoing. Full expansion of such intumescent materials may occur within 3-5 minutes or less.

According to embodiments of the invention, the intumescent materials can be also configured to expand due to the increase in temperature within the apparatus 100 as a result of the failing batteries 130. Here, the heating pads can be excluded in the intumescent made activators 170. In addition, the activators 170 can be linear actuators or motors.

As shown in FIGS. 1-5, a transfer channel assembly 180 (shown individually in FIG. 3A) is provided with the battery enclosure 110. As illustrated in FIGS. 1, 4 and 5, the transfer channel assembly 180 is coupled with the battery containment structure 150 allowing the transfer and/or containment of the gases emitted by the batteries 130 during the thermal runaway process. As shown in FIG. 3A, the transfer channel assembly 180 includes an overflow containment vat 380. The overflow containment vat 380 provides additional volume for the gasses emitted by the faulty batteries 130 to reduce pressure within the battery containment structure 150. The size of the overflow containment vat 380 may vary based on the structure and purpose of the apparatus 100. However, the overflow containment vat 380 does not need to have capacity to contain the gas of all the batteries 130 because it is unlikely that all batteries 130 fail simultaneously.

Figure 2:
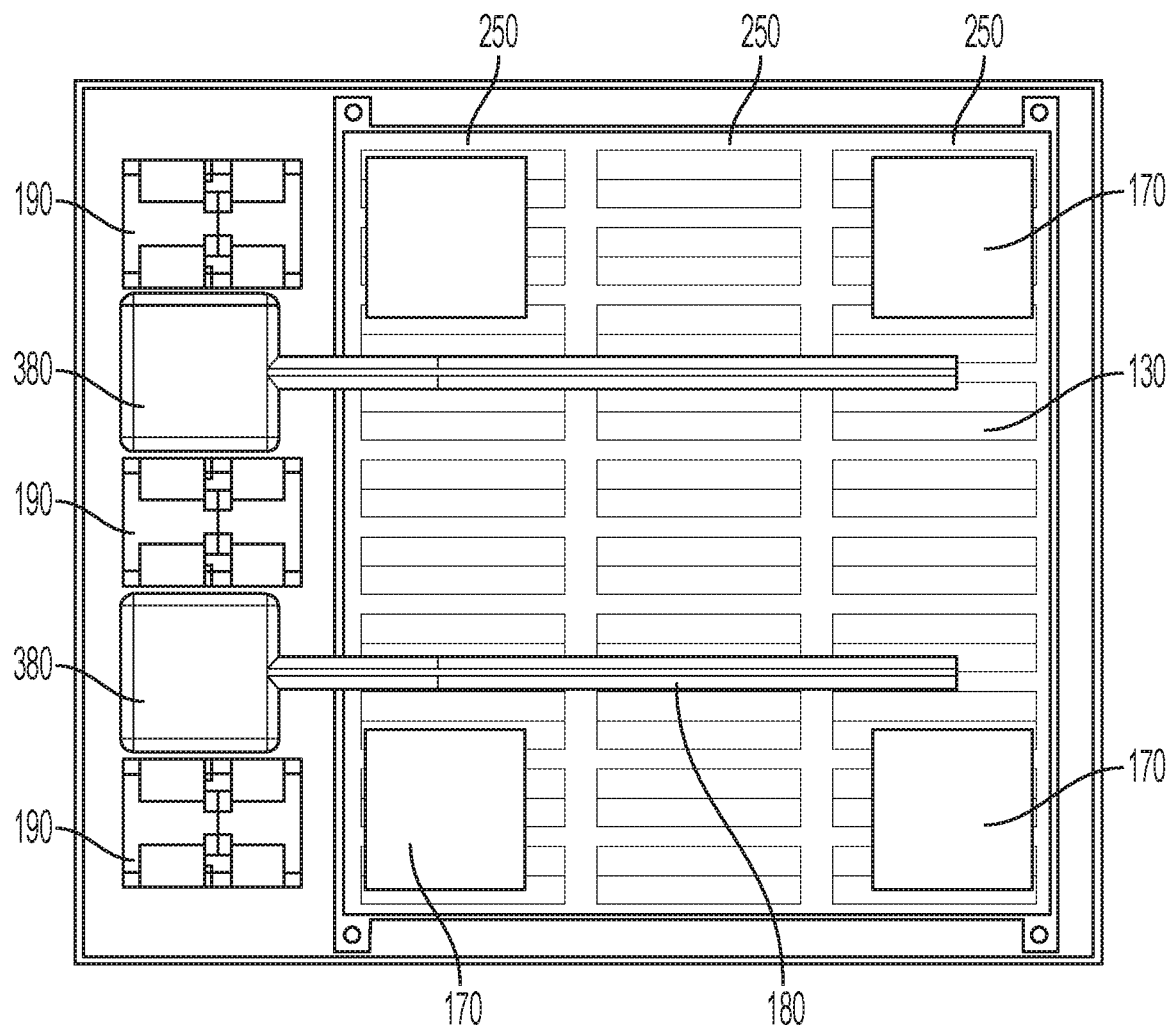
FIG. 2 depicts a top view of the apparatus that includes a plurality of battery containment structures according to embodiments of the invention.

In embodiments of the invention, the apparatus 100 can include several battery containment structures 250. Each of the battery containment structures 250 can have the respective dedicated activators. In other words, when the failing battery 130 is detected only one of the containment structures 250 is activated to cover and seal the failing battery 130, while the remaining non-failing batteries 130 continue operation under normal conditions. FIG. 2. illustrates three containment structures 250. The apparatus 100 can, however, include any number of the battery containment structures 250. For example, the apparatus 100 can contain the battery containment structures 250 for each of the batteries 130. In this embodiment, a means to disconnect out of the circuit, remove and replace the failed battery 130 is provided, for example, using a jumper switch. Further, when the battery containment structures 250 are configured to isolate each individual battery 130, the battery containment structures 250 will contain all the emitted gas for a single battery 130. When the battery containment structure 250 is used to isolate the individual failed battery 130, the overflow containment vat 380 is not used because the transfer channel assembly 180 would have to extend in one area where the individual containment structure 250 is activated, but not others that are still in the non-activated position. Covers over the transfer channel assemblies 180 can be provided to prevent the gas being spread to neighboring batteries 130. The covers are configured to open when the containment structure 250 drops (i.e., activates).

According to embodiments of the invention, the overflow containment vat 380 can include the material to absorb and neutralize the harmful gasses emitted by the failing battery 130. The type of the material would depend on the type of the batteries used in the apparatus 100.

Figure 6:
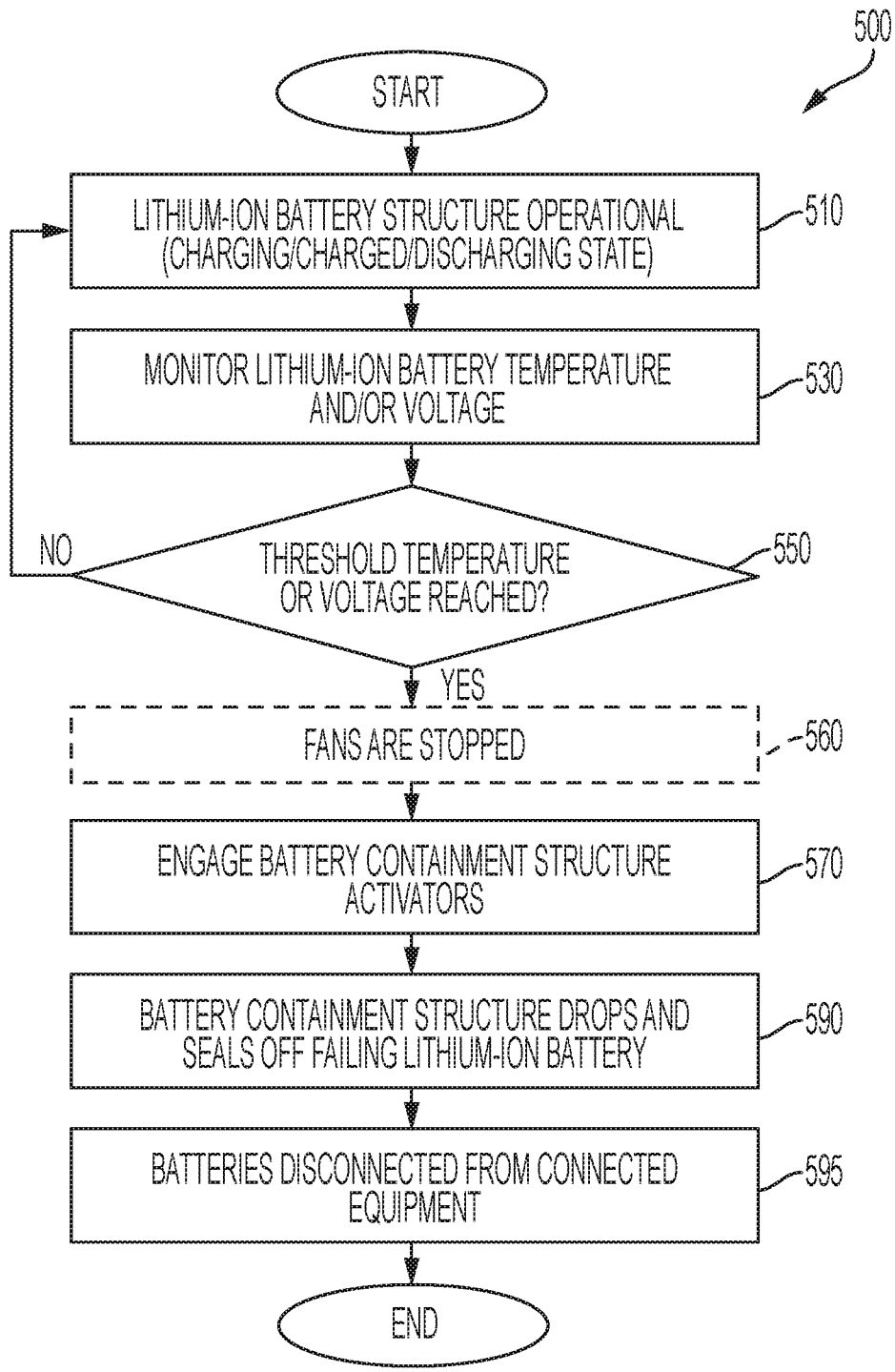
FIG. 6 depicts a flow diagram illustrating a method of operating the apparatus according to embodiments of the invention.

FIG. 6 is a flow diagram illustrating a method 500 for using the apparatus 100 according to embodiments of the invention. The method 500 includes installing and connecting the apparatus 100 to a computer system, such as a computer server. For example, the apparatus 100 can be installed and running in a computer server with a lithium-ion battery pack being either fully charged, in a charging state, or in a discharging state. Block 510 shows the batteries 130 in the operational condition state of charging/charged/discharging. According to embodiments of the invention, each of the batteries 130 can include a temperature and/or voltage monitoring device, such that a processor can oversee the state of each individual battery.

Block 530 monitors the temperature and/or voltage of each battery 130. The threshold temperature and/or voltage can be set to a level in which it is known that there is a battery failure, but the process of venting of gases by the failed battery has not yet begun. If the threshold is not reached, the block 550 loops back to block 510, allowing the apparatus 100 to operate normally, while continuously monitoring the temperature and/or voltage of each of the battery 130.

If the threshold temperature and/or voltage are reached, block 570 engages activators 170. Prior to block 570, optionally, block 560 can disengage the fans 190 to limit or prevent the emittance of harmful gasses from the second perforated opening 122 should a small amount escape before the engagement process at block 570 completes. However, under certain conditions, the fans 190 can remain operational to cool the battery containment structure 150.

Block 590 drives the battery containment structure 150 downward thereby sealing the faulty batteries 130 to contain emitted gasses during a thermal runaway event and to prevent cascading. Block 595 disconnects, for example, via a switch, the apparatus 100 from the equipment. Alternatively, prior to block 570, when the threshold temperature and/or voltage are reached, the apparatus 100 can be disconnected from the equipment prior to engaging the battery containment structure 150. It has been determined that the lithium-ion battery (specifically the Samsung 20S INR18650 2000 mAh 3.6V unprotected high-drain 30A lithium-ion flat top battery) can take less than 25 minutes to ignite after a temperature increase has been detected by sensors. Further, when a substantial voltage drop is detected, the lithium-ion battery ignites in less than 9 minutes. Accordingly, it has been determined that there is a time period between the temperature increase and/or voltage drop in lithium-ion batteries prior to ignition and the emission of gasses. During this time period the battery containment structure 150 can be engaged to seal off one or more of the failing batteries 130 and the apparatus 100 can be disconnected from the equipment.

The foregoing detailed description of the embodiments is used to further clearly describe the features and spirit of the present invention. The foregoing description for each embodiment is not intended to limit the scope of the present invention. All kinds of modifications made to the foregoing embodiments and equivalent arrangements should fall within the protected scope of the present invention. Hence, the scope of the present invention should be explained most widely according to the claims described thereafter in connection with the detailed description, and should cover all the possible equivalent variations and equivalent arrangements.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form described. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for gas containment in a non-sealed apparatus for batteries, the method comprising:
   connecting the non-sealed apparatus for batteries with a system, wherein the non-sealed apparatus for batteries comprises:
      a battery enclosure with an upper portion and a lower portion, wherein the battery enclosure has a first perforated opening and a second perforated opening;
      a plurality of batteries disposed in the lower portion of the battery enclosure;
      a battery containment structure disposed in the upper portion of the battery enclosure positioned vertically over a portion of the plurality of batteries, the battery containment structure comprising an activator and two or more separators, the battery containment structure comprising a sealing surface configured to seal the portion of the plurality of batteries by the application of a pressing force from the activator in a direction perpendicular to a bottom surface of the battery enclosure;
      a transfer channel assembly disposed within the battery enclosure; and
      at least one fan configured to circulate air in and out of the battery enclosure through the first perforated opening and the second perforated opening;
   monitoring each battery of the plurality of batteries for a condition;
   responsive to the condition being reached for a battery of the plurality of batteries, moving downward the respective battery containment structure disposed above the battery until the respective sealing surface contacts a gasket on the bottom surface of the battery enclosure, thereby sealing the first battery upon the condition being reached;
   containing or transferring out gases emitted by the battery via channels in the transfer channel assembly coupled to a containment vat; and
   disconnecting the non-sealed apparatus for batteries from the system.

2. The method of claim 1 further comprising of:
   disengaging the at least one fan to limit the emittance of gasses from the second perforated opening.

3. The method of claim 1, wherein the at least one battery containment structure comprises a plurality of the battery containment structures.

4. The method of claim 1, wherein the plurality of batteries comprises lithium-ion batteries.

5. The method of claim 1, wherein the condition is a temperature increase of at least one of the plurality of batteries.

6. The method of claim 1, wherein the condition is a voltage drop of at least one of the plurality of batteries.

7. The method of claim 1, wherein the activator comprises an intumescent material.

8. The method of claim 1 further comprising of:
   engaging an actuator of the activator to move downward the at least one battery containment structure.

* * * * *